(12) United States Patent
Nobili (10) Patent No.: US 12,152,376 B2
(45) Date of Patent: Nov. 26, 2024

(54) VALVE FOR A BATHROOM OR KITCHEN HAND SHOWER

(71) Applicant: Fabrizio Nobili, San Vittore (CH)

(72) Inventor: Fabrizio Nobili, San Vittore (CH)

( * ) Notice: Subject to any disclaimer, the term of this patent is extended or adjusted under 35 U.S.C. 154(b) by 431 days.

(21) Appl. No.: 17/590,069

(22) Filed: Feb. 1, 2022

(65) Prior Publication Data

US 2022/0243432 A1  Aug. 4, 2022

(30) Foreign Application Priority Data

Feb. 3, 2021  (EP) .................................... 21155046

(51) Int. Cl.
*E03C 1/02* (2006.01)
*B05B 1/16* (2006.01)
(Continued)

(52) U.S. Cl.
CPC .............. *E03C 1/02* (2013.01); *B05B 1/1636* (2013.01); *B05B 1/169* (2013.01); *B05B 1/185* (2013.01);
(Continued)

(58) Field of Classification Search
CPC ......... E03C 1/02; B05B 1/1636; B05B 1/169; B05B 1/185; B05B 12/002; B05B 12/04; F16K 11/074; F16K 31/53
(Continued)

(56) References Cited

U.S. PATENT DOCUMENTS 7,000,854 B2 * 2/2006 Malek ....................... E03C 1/04
239/525
10,871,236 B2  12/2020 Kinle et al.
(Continued)

FOREIGN PATENT DOCUMENTS

CA  2990451 A1  6/2019
EP  3135383 A1  3/2017
(Continued)

OTHER PUBLICATIONS

Jul. 2, 2021 Search Report issued in European Patent Application No. 21155046.

*Primary Examiner* — Steven J Ganey (57) ABSTRACT

A valve for a bathroom or kitchen hand shower is described including—a body of the valve; —an inlet for the water into the body of the valve; —at least one outlet for the water out of the body of the valve, —a closing body inside the body of the valve; —an actuation device for shifting the closing body along a first axis between at least one closing position of a fluid path between the inlet and one of said at least one outlet and an opening position of the fluid path between the inlet and said at least one of said at least one outlet; —an actuator button outside the body of valve associated with the actuation device. The actuation device includes a cam located in the body of the valve and a stepwise advancement mechanism located outside the body of the valve and operatively associated with the cam, the cam being associated with the closing body of the valve and the advancement mechanism advancing by one step upon each next shift of the actuator button from a release position to an actuation position, by moving the closing body between the closing and opening positions, —an elastic return system is operative between the actuator button and the body of the valve and between the actuator button and the advancement mechanism, to return the actuator button from the actuation position to the release position and to reposition the advancement mechanism for a next step.

14 Claims, 11 Drawing Sheets

(51) Int. Cl.
  *B05B 1/18* (2006.01)
  *B05B 12/00* (2018.01)
  *B05B 12/04* (2006.01)
  *F16K 11/074* (2006.01)
  *F16K 31/53* (2006.01)

(52) U.S. Cl.
  CPC ............ *B05B 12/002* (2013.01); *B05B 12/04* (2013.01); *F16K 11/074* (2013.01); *F16K 31/53* (2013.01)

(58) Field of Classification Search
  USPC ........................................ 239/443, 445, 525
  See application file for complete search history.

(56) References Cited

U.S. PATENT DOCUMENTS

| 2010/0237160 A1* | 9/2010 | Miller | ....................... B05B 1/18 239/443 |
| 2012/0312899 A1* | 12/2012 | Miller | ....................... B05B 1/18 239/443 |

FOREIGN PATENT DOCUMENTS

| EP | 3456418 A1 | 3/2019 |
| EP | 3485981 A1 | 5/2019 |

\* cited by examiner

SECTION A-A

SECTION A-A

Fig. 8

Fig. 9
SECTION A-A

Fig. 10

SECTION A-A

SECTION A - A

VALVE FOR A BATHROOM OR KITCHEN HAND SHOWER

FIELD OF APPLICATION

The present invention relates to a valve for a bathroom or kitchen hand shower.

In particular, the invention relates to a valve of the above-mentioned type intended for opening or closing a fluid path from an inlet of the valve to an outlet, or for diverting the fluid from a first fluid path, which connects the inlet to a first outlet, to a second path which connects the inlet to a second outlet.

Even more particularly, the invention relates to a valve for controlling the fluid output simultaneously from more outlets, for example two outlets, or selectively from a subset of the outlets, in particular an outlet.

The invention also relates to a bathroom or kitchen hand shower including a valve of the above-mentioned type.

PRIOR ART

It is known that a valve for a bathroom or kitchen hand shower can be incorporated in the same hand shower to open or close a fluid path from an inlet of the valve to an outlet, or to divert the fluid from a first fluid path to a second fluid path, for example to switch the water delivery mode from a rain delivery mode, in which multiple nozzles are connected to the first fluid path, to a cohesive jet delivery mode, in which a central nozzle is connected to the second fluid path.

A valve for a bathroom or kitchen hand shower is also known, which can be incorporated in the hand shower to control the fluid output simultaneously from more outlets, for example two outlets (whether they are associated, respectively, with the multiple nozzles and with the central nozzle, or with other nozzles), or to control the fluid output selectively, from a subset of the outlets (again referring to the example mentioned above in brackets, to control the output only from the multiple nozzles or only from the central nozzle).

The valves in question, for aesthetic and handling reasons, are preferably hidden, i.e. incorporated, inside the body of the hand shower, and are normally actuated by a manual button, which is located on the handle of the hand shower, for example in a portion which connects the head of the hand shower, where the nozzles are situated, and the handle of the hand shower. It is often required that this portion has a very limited thickness, for example less than two centimetres, because it is desired that the overall thickness of the hand shower, and hence of the various components (such as the handle and the head) be equally limited, in order to contain the size of the hand shower and the weight thereof, but also to meet precise aesthetic and market demands.

Therefore, solutions have always been sought that can reduce the size of the valve, without however losing the advantageous characteristics of the valve, but rather trying to improve them, and in particular trying to prolong the duration thereof over time, the perfect tightness on the fluid path(s) between the inlet and the outlet(s), but also the comfort of use, which is related not only to the simplicity and intuitiveness of the valve command, but also to its precision of operation, which the user feels by reacting upon opening, closing or switching at each exact manual operation of the valve, i.e. without having to repeat a failed command. This precision sometimes derives from the interface of the valve toward the button of the hand shower, that is, from those components of the valve which are capable of receiving the command imparted by the user through the button.

The technical problem underlying the present invention is to devise a valve for a bathroom or kitchen hand shower, and a relative hand shower, which are capable of overcoming all the drawbacks of known valves and hand showers, in particular, capable of reducing the size of the valve and hence the size of the hand shower, at least at a portion of the hand shower in which the valve is housed, of ensuring high reliability and durability over time, and of improving the perception of control by the user.

SUMMARY OF THE INVENTION

The basic idea of the present invention is to realize a hand shower valve including
 an advancement mechanism, located outside a body of the valve, and
 a cam, associated with the advancement mechanism but located inside the body of the valve,
where the advancement mechanism is made to advance one step at a time by a button, and at each step of the advancement mechanism the cam shifts a closing body of the valve, between two operating positions.

In particular, again according to the solution idea described above, the arrangement of the valve components inside and outside the body of the valve allows limiting the overall size of the valve.

On the basis of the solution idea set forth above, the technical problem is solved by a valve for a bathroom or kitchen hand shower including
 a body of the valve;
 an inlet for the water into the body of the valve;
 at least one outlet for the water out of the body of the valve;
 a closing body inside the body of the valve;
 an actuation device for shifting the closing body along a first axis (X) between at least one closing position of a fluid path between the inlet and one of the at least one outlet and an opening position of the fluid path between the inlet and the at least one of said at least one outlet;
 an actuator button outside the body of the valve associated with the actuation device;
 wherein
 the actuation device includes a cam located in the body of the valve and a stepwise advancement mechanism located outside the body of the valve and operatively associated with the cam, the cam being also associated with the closing body of the valve and the advancement mechanism advancing by one step upon each next shift of the actuator button from a release position to an actuation position, making the closing body move between the closing and opening positions, where
 an elastic return system is operative between the actuator button and the body of the valve and between the actuator button and the advancement mechanism, to return the actuator button from the actuation position to the release position and to reposition the advancement mechanism for a next step.

In one embodiment, the cam rotates on a second axis (X') parallel to the first axis (X) of displacement of the closing body and the advancement mechanism includes at least one toothed wheel mounted on the second axis and at least one rod provided with a shaped profile and applied to the actuator button, the elastic return system being configured to keep the shaped profile in contact with the toothed wheel, where the contact between the toothed wheel and the shaped profile is interrupted only in the actuation position of the actuator button.

In one embodiment, the elastic return system includes a first spring, between an outer surface of the body of the valve and the actuator button, and a second spring, between the rod and the actuator button.

For example, the actuator button includes a plate rotatably engaged, at a first side, under the outer surface of the body of the valve, and at a second side, with the at least one rod. The second side of the plate is opposite the first.

In particular, the first side of the plate is rotatable on a third axis (X") parallel to the first axis (X) of displacement of the body of the valve, and the plate is parallel to the outer surface of the body of the valve, in the actuation position of the actuator button, or at a predetermined inclination with respect to the outer surface of the body of the valve, in the release position of the actuator button, the third axis of displacement (X") parallel to the first axis (X) of displacement remaining fixed.

In particular, the second side of the plate is rotatable on a fourth axis (X'") parallel to the first axis of displacement (X) of the body of the valve, the fourth axis of displacement (X'") being movable.

In particular, the plate includes a coupling profile of an end of the second spring, and the rod includes a second coupling profile of an opposite end of the second spring.

In particular, the plate includes a coupling profile of an end of the first spring and the body of the valve includes another coupling profile of the opposite end of the first spring, the first and second spring extending along directions that are inclined the one with respect to the other.

In one embodiment, the valve includes a closing cover of the body of the valve and the cam includes a plurality of inclined teeth, arranged on a circumferential surface of the cam, and the cover includes a profile which engages the circumferential surface between the teeth or teeth, preventing a rotation of the cam in a direction of rotation opposite to the direction of rotation imparted to the cam by the advancement element.

A closing cover of the body of the valve and the cam may include respective profiles which prevent a rotation of the cam in a direction of rotation opposite to the direction of rotation imparted to the cam by the advancement element.

In one embodiment of the present invention, the toothed wheel includes a plurality of teeth, in particular inclined in the same direction of inclination as the teeth of the cam, if provided on the cam, the cam and the toothed wheel having the second axis of rotation (X') in common.

A shaft is located between the cam and the closing body of the valve, the closing body includes a cylinder provided with at least one dosing gasket of the at least one fluid path and a profile for coupling to the shaft, at the side of the at least one closing gasket, the cylinder having an axis (X) corresponding to the first axis (X) of displacement.

The shaft is structurally associated with a plate sliding in a space delimited between a wall of the body of the valve which subdivides a housing seat (A) of the cam from a housing seat (B) of the closing body, the housing seat (B) of the closing body being spaced from the wall in equal measure as the thickness of the plate.

The plate has a height (H) equal to a height close to the wall (P) and a lower height between the housing seat (A) of the cam and a housing seat (B) of the closing body.

The housing seat (A) of the cam has a smaller width than that of the housing seat (B) of the closing body, and the housing seat (B) of the closing body has a width substantially corresponding to the sum of the width of the housing seat (A) and of the thickness of the at least one toothed wheel, the at least one toothed wheel being aligned at the housing seat (B) along a fifth axis (X"") perpendicular to the second axis of displacement (X').

In particular, the actuator button is hand-operated.

The valve is insertable or inserted into a bathroom or kitchen hand shower.

Further details and characteristics of the valve and of the bathroom or kitchen hand shower according to the present invention will be evident from an embodiment given by way of non-limiting example with reference to the attached drawings.

DETAILED DESCRIPTION OF AN EMBODIMENT

Figure 21:
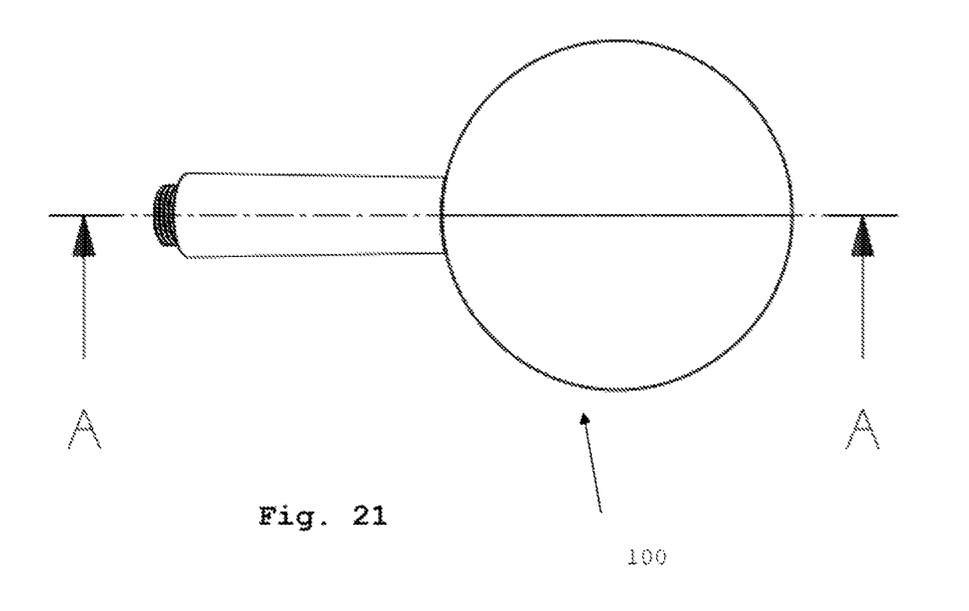
FIG. 21 is a top view of a hand shower incorporating the valve of FIG. 1.

With reference to the accompanying drawings, an example of embodiment of a valve according to the present invention, and a detail of a valve 1 (FIG. 1) for a bathroom or kitchen hand shower 100 (FIG. 21) are given below.

Figure 20:
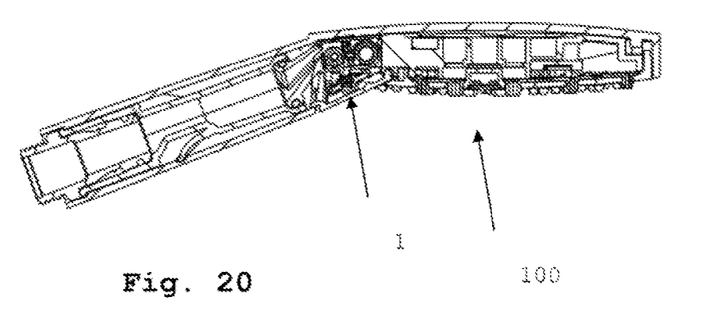
FIG. 20 is a sectional view A-A of the valve of FIG. 21.

The valve 1 can be incorporated in the same hand shower (FIG. 20) to open or close a fluid path from an inlet of the valve to an outlet, or to divert the fluid from a first fluid path to a second fluid path, for example to switch the water delivery mode from a rain delivery mode, in which plural nozzles are connected to the first fluid path, to a cohesive jet delivery mode, in which a central nozzle is connected to the second fluid path.

The example given with reference to the figures relates in particular to a valve 1 for a bathroom or kitchen hand shower 100 adapted to control the fluid output simultaneously from more outlets (for example associated, respectively, to the multiple nozzles and to the central nozzle of the hand shower), or to control the fluid output selectively, from a subset of the outlets (i.e. to control the output only from the multiple nozzles or only from the central nozzle).

The valve includes a body 2 (FIG. 1), hereinafter referred to as the body of the valve 2, made for example of plastic material, and provided with an inlet 3 for the water and at least one outlet 38, 39 for the water out of the body of the valve 2. In the example of the figures, the body 2 includes two outlets 38, 39, but nothing prevents the body 2, according to variants of embodiment of the valve 1 according to the present invention, from including a single outlet or more than two outlets.

A closing body 4 is located inside the body of the valve 2 (FIG. 2) and an actuation device 10 is configured to shift the dosing body 4 along a first axis X, between at least one closing position of a fluid path 5 between the inlet 3 and one of the outlets 38 and an opening position of the fluid path 5.

Figure 2:
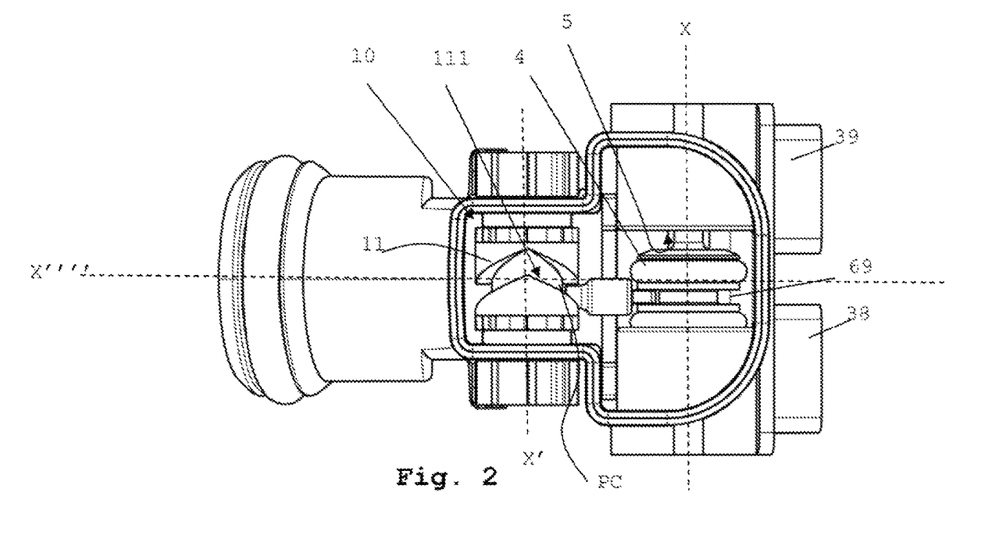
FIG. 2 is a top view of the valve of FIG. 1, after removing a cover of the valve.
Figure 3:
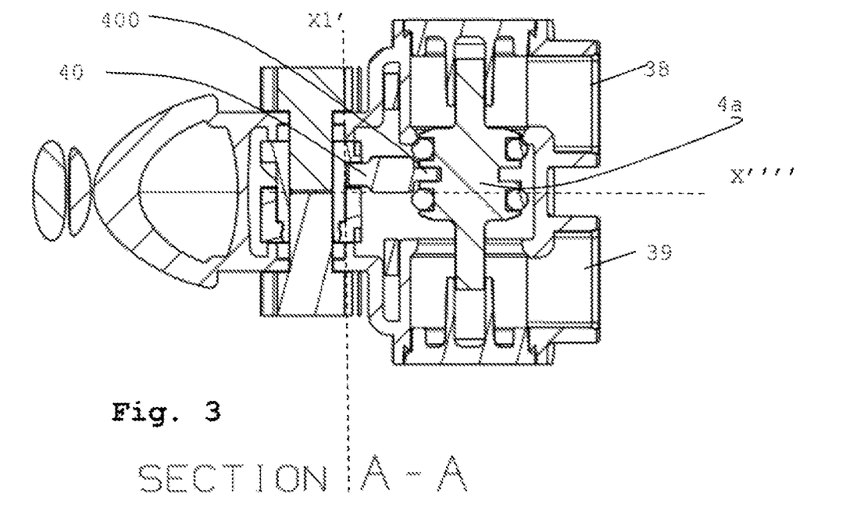
FIG. 3 is a sectional view A-A of the valve of FIG. 4.
Figure 12:
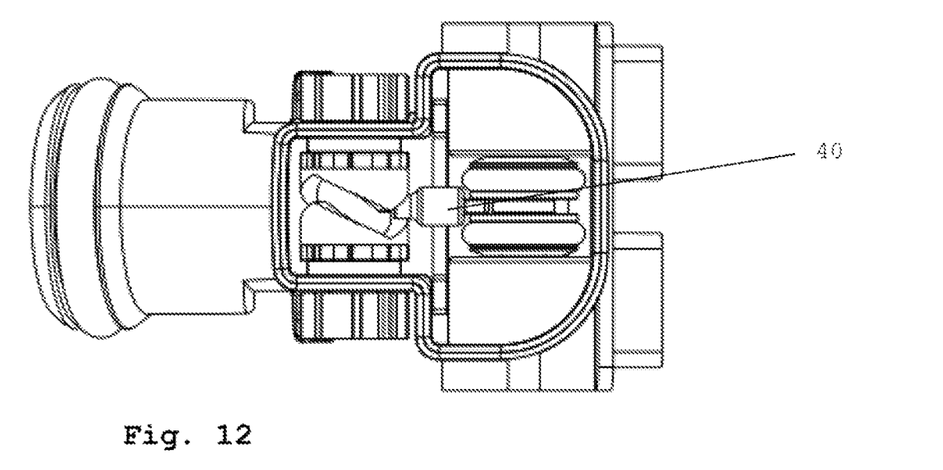
FIG. 12 is a view of the valve of FIG. 2 in the opening phase of two water outlets.
Figure 13:
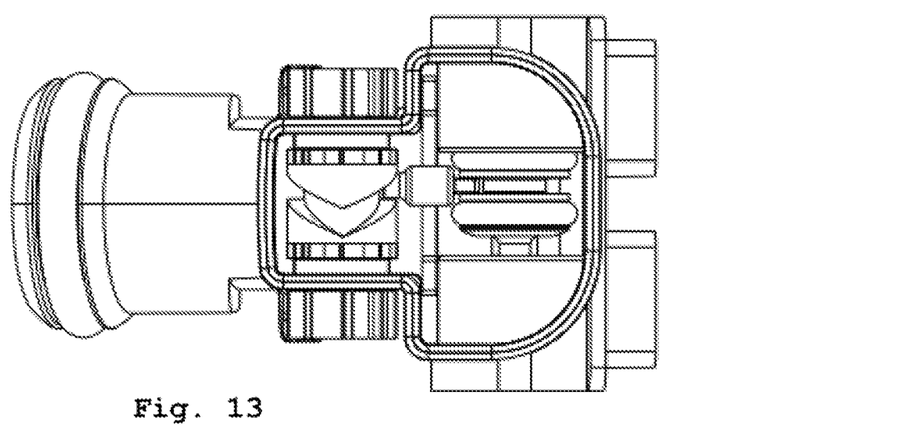
FIG. 13 is a view of the valve of FIG. 2 in the closing phase of one of two water outlets.
Figure 14:
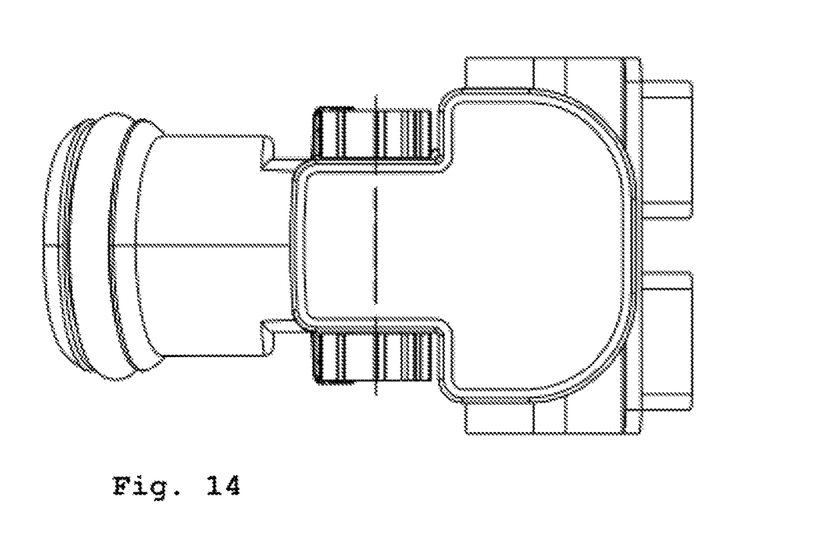
FIG. 14 is an enlarged view of FIG. 12.
Figure 15:
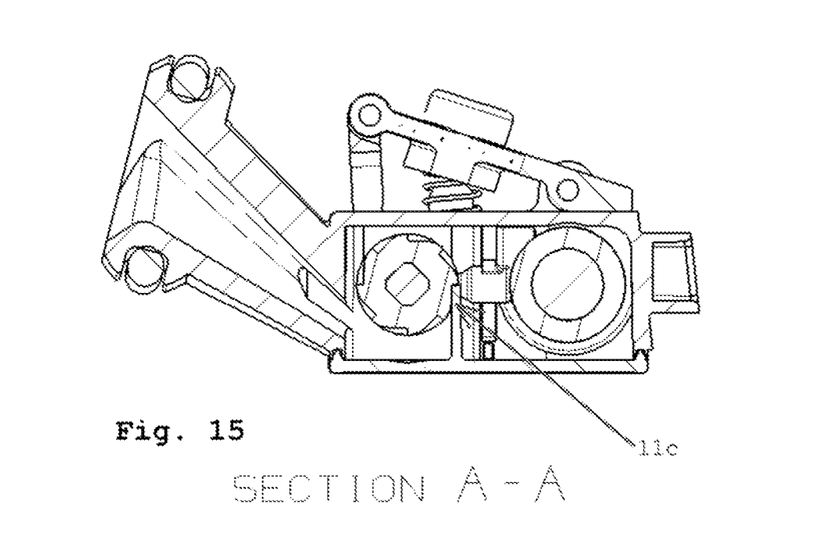
FIG. 15 is a sectional view A-A of the valve of FIG. 16.
Figure 16:
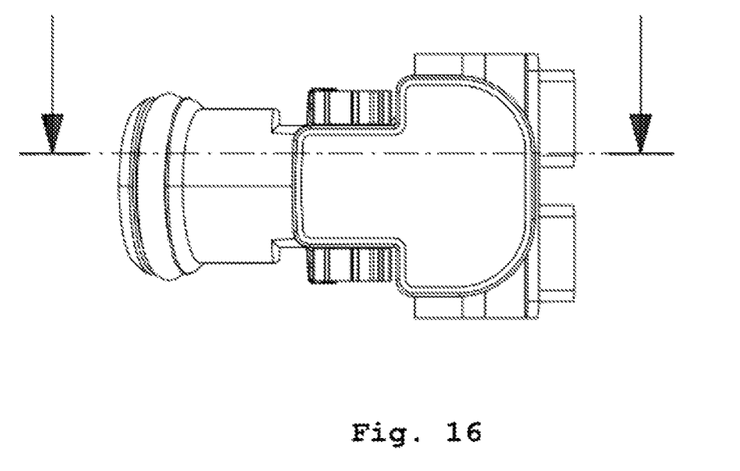
FIG. 16 is a side view of the valve of FIG. 1.

For example, and again with specific reference to the figures, the given embodiment has a closing body 4 which can be shifted into three different operating positions: in an operating position, shown in FIG. 2, the closing body 4 closes the fluid path toward an outlet 38, leaving instead the fluid path toward an outlet 39 free; in another operating position, shown in FIG. 12, the closing body 4 partially leaves both the fluid path toward the outlet 38 and the fluid path toward the outlet 39 free; in another operating position, shown in FIG. 13, the closing body 4 closes the fluid path toward the outlet 39, leaving instead the fluid path toward the outlet 38 free. The outlet 38 can be connected, for example, to the peripheral nozzles of the hand shower, and the outlet 39 connected to the central nozzle, so that the different operating positions of the closing body correspond to a rain delivery, to a simultaneous rain and cohesive delivery (i.e. from both outlets 38, 39) or to a cohesive delivery.

As said, according to embodiments, the body of the valve 2 can have a single outlet or more than two outlets. For example, in the case of a single outlet, the closing body 4 can be operative between two positions, respectively, for closing and opening a fluid path from the inlet 3 to the only available outlet, thus providing a simple valve for opening and closing the flow.

Figure 1:
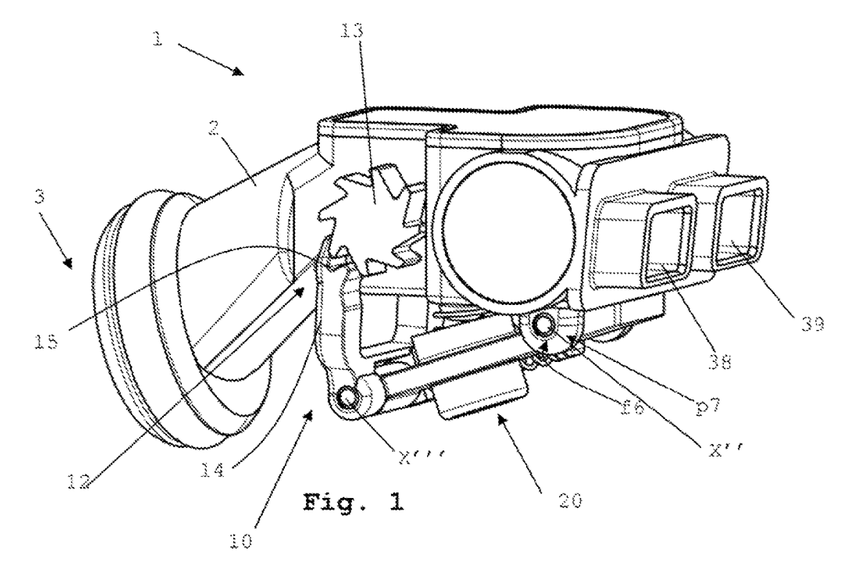
FIG. 1 is a perspective view of the valve according to an embodiment of the present invention.

The actuation device 10 is actuated by an actuator button 20 located outside the body of the valve 2 (see for example FIG. 1).

The actuator button 20 is hand-operated and is configured to maintain a stable position, such as that shown in FIG. 1, when no pressure is exerted thereon, this position also being indicated below as a rest position. In particular, in the given embodiment, the stable or rest position is ensured by an elastic return system, which will be described below. The actuator button 20 is configured to reach a trigger position (also called operating position) of the actuation device 10, at which the actuation device 10 shifts the closing body 4 along the first axis X.

In one aspect of the present invention, a shift of the actuator button 20 (for example with manual pressure by the user) from the rest position to an intermediate position, prior to the operating position, may entail a shift of the actuation device 10, without however triggering the shift of the closing body 4. Therefore, a release of the actuator button from the intermediate position to the rest position (without reaching the operating position) restores the actuation device 10 to a previous configuration.

According to the present invention, the actuation device 10 includes a cam 11 located in the body of the valve 2 and a stepwise advancement mechanism 12 located outside the body of the valve 2, operatively associated with the cam 11.

The cam 11 can be seen in FIG. 2, since in this figure a cover 30 of the valve 1 has been removed. In FIG. 2, the closing body 4 is off-centre with respect to a portion of the valve body 2 forming its seat (also indicated as seat B in FIG. 5), being, as said before, in the operating closing position of the outlet 38, said outlet being delimited, in fact, on one side of the valve body 2. The cam 11, on the other hand, is centred with respect to a seat thereof (indicated as seat A in FIG. 5). The seat B is located between the seat A and the outlets 38, 39, and the seat A is located between the inlet 3 and the seat B. Preferably, the inlet 3 has a diameter ranging between the diameter of the seat A and the diameter of the seat B, which has a larger diameter than the seat A. The outlets 38, 39 are aligned. Such a spatial configuration of the seats A, B, of the inlet 3 and of the outlets, as well as the configuration of the actuation device 10 and of the actuator button 20 with respect to the body of the valve 2, allows to considerably reduce the size of the valve 1.

The cam 11 (FIG. 5) is for example formed by a toothed wheel 111, which includes a hollow cylindrical body, provided with an outer profile 11*c*, on which the toothing 11*b* is formed, the function of which is described in greater detail below. In particular, the outer profile 11*c* is at the base of the hollow cylindrical body. The toothed wheel 111 is in the seat A, in particular with the outer profile 11*c* turned toward an opening (hole) of the seat A by means of which the hollow cylindrical body, and therefore the cam 11, is operatively associated with the actuator button 20.

In one embodiment, the cam 11 (FIG. 5) is formed by two toothed wheels 111, each with its own hollow cylindrical body provided with an outer profile 11*c*, on which the toothing 11*b* is formed, which are coupled together so as to form the profile PC of the cam 11, and both toothed wheels 111 are located in the seat A, each, at an opening (hole F) of the seat A on a respective side wall AL of the seat A, for the operating association of the cam 11 with the actuator button 20.

Figure 5:
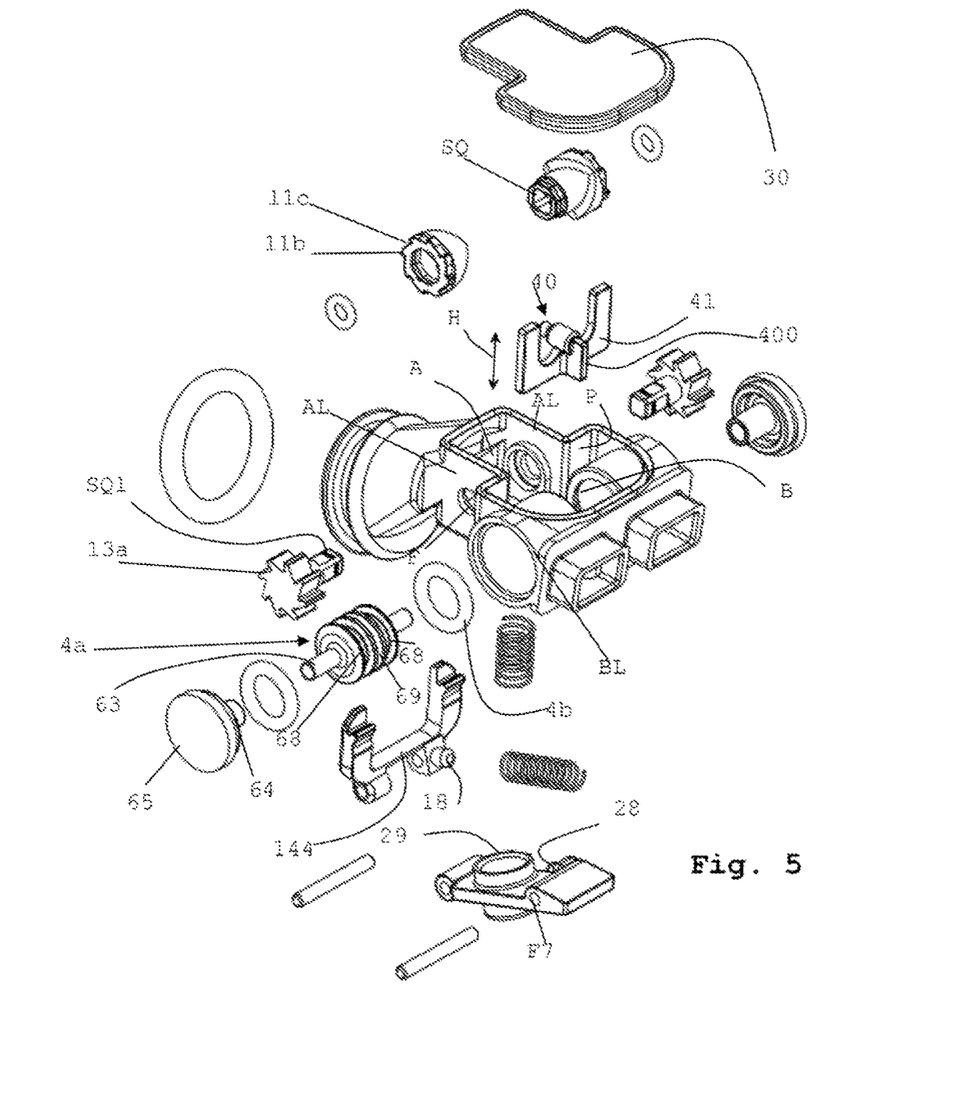
FIG. 5 is a view with detached parts of the valve of FIG. 1.
Figure 6:
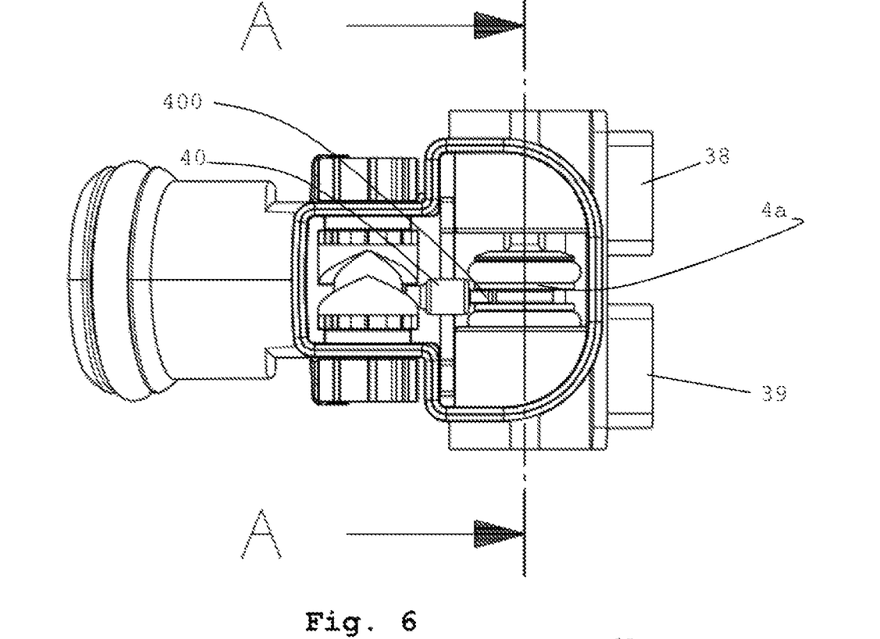
FIG. 6 is a top view of the valve of FIG. 2.
Figure 7:
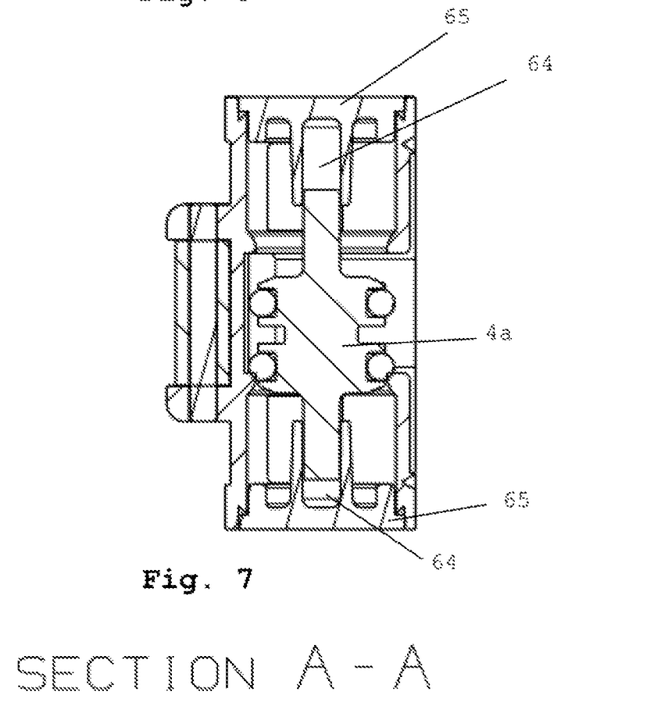
FIG. 7 is a sectional view A-A of the valve of FIG. 6.
Figure 8:
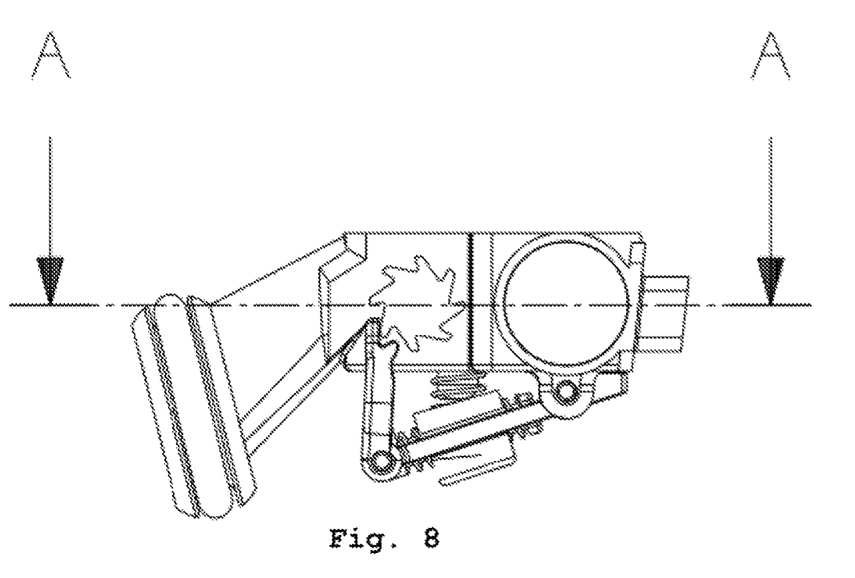
FIG. 8 is a side view of the valve of FIG. 2.
Figure 9:
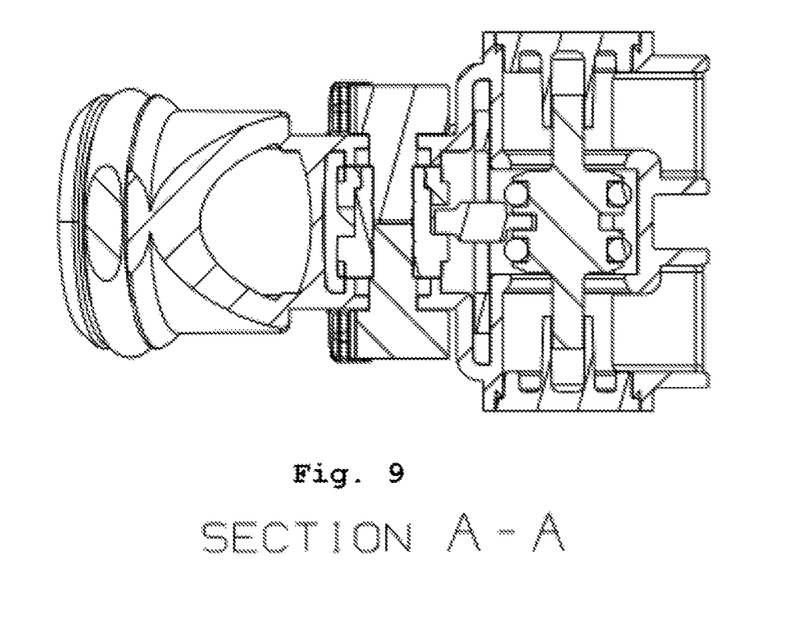
FIG. 9 is a sectional view A-A of the valve of FIG. 8.
Figure 10:
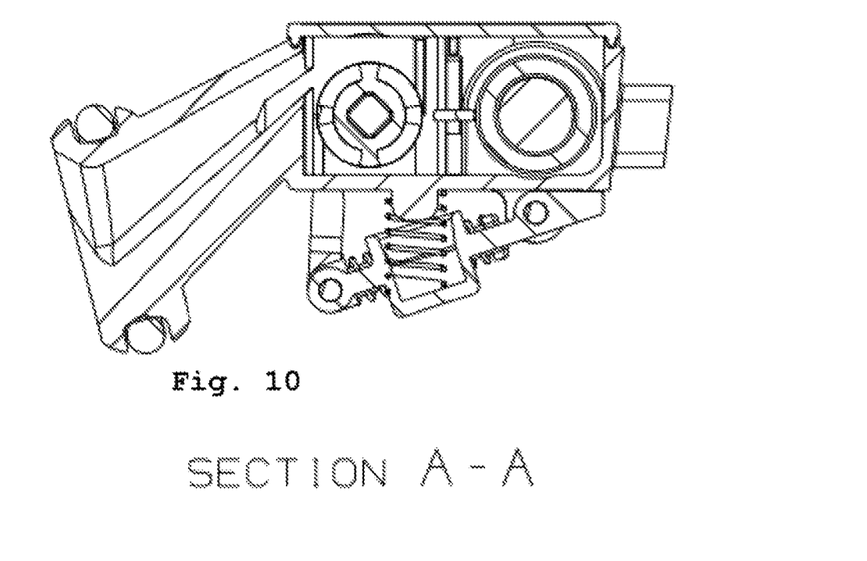
FIG. 10 is a sectional view A-A of the valve of FIG. 11.
Figure 11:
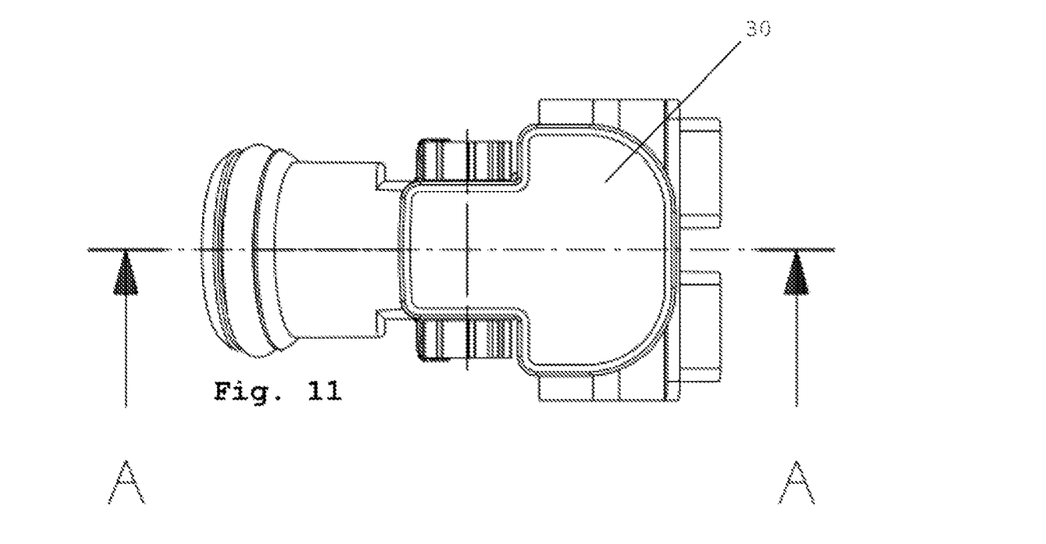
FIG. 11 is a top view of the valve of FIG. 1.

The cam 11 is associated with the closing body 4 of the valve through a shaft 40 sliding in the profile PC of the cam 11. This association is preferably obtained by shape coupling between a laminar profile 400, structurally associated with the shaft 40 which, when assembled, is turned toward the closing body 4 and not toward the cam 11. The laminar profile 400 enters a seat 69 of the closing body 4 located between two annular sectors 68 of the closing body 4, on which respective sealing gaskets 4*b* are mounted (FIG. 5).

The seat B is perforated on opposite sides BL (FIG. 5), where two closure plugs 65, provided with a guide 64 extending inside the seat B, are inserted, for the hermetic closure of the seat B. The distal and proximal portions of the closing body 4 include an axis 63 which, in use, slides in the guides 64 of the closure plugs 65, in particular partially retracting or extending in a guide, as a function of the shift imparted to the closing body 4 by the cam 11, which is, along the axis of displacement X, lateral with respect to seat B.

The advancement mechanism 12 is configured to advance by one step upon each next shift of the actuator button 20 from the release position (i.e. from the rest position) to an actuation position (i.e. the operating position), causing the closing body 4 to move between two operating positions.

In the given embodiment, the advancement mechanism 12 includes a toothed wheel 13 associated with the cam 11. For example, the hollow cylindrical body of the cam 11 includes a square-section hole SQ (FIG. 5) and the toothed wheel 13 includes a square-section portion SQ1, which can be inserted in the square-section hole SQ of the hollow cylindrical body, passing through the hole F of the side wall AL of the seat A. In particular, both hollow cylindrical bodies of the cam 11 include the square-section hole SQ and respective toothed wheels 13, each including a square-section portion SQ1 insertable into the square-section hole SQ of the hollow cylindrical bodies, passing through a hole F on opposite walls of the seat A, thus allowing a structural coupling of the cam 11 to the advancement mechanism 12, on both sides of the body of the valve 2.

The advancement mechanism 12 further includes a lever 14 for the functional interconnection between the actuator button 20 and the toothed wheel 13, in particular two levers 14, each for coupling with a toothed wheel 13 at the sides of the seat A, in particular two levers 14 structurally connected to each other, for example, by a structural interconnecting bar 144, in particular made in one piece with the levers 14. In the following description, reference is made to a single lever 14 for simplicity's sake of illustration only. However, the two-lever embodiment 14 is in particular for balance and symmetry of the components of the valve 2, as well as for precision of command.

The lever 14 has a shaped profile 15 which, in use, engages the toothed wheel 13, in particular a tooth 13a of the wheel 13. A shift of the lever 14, which substantially follows a direction parallel to a tangent of the toothed wheel 13, causes a rotation of the toothed wheel 13. The engagement of the lever 14/toothed wheel 13 is maintained up to a predetermined angular shift of the toothed wheel 13, in particular by 45° from an initial position, corresponding to the rest position of the actuator button 20. When the predetermined angular displacement is reached, at the operating position of the actuator button 20, the contact between the tooth 13a of the wheel 13 and the lever 14 gets lost, and the trigger position of the actuation device 10 is reached, which causes the closing body 4 to shift between two operating positions. When the actuator button 10 is released, the profile of the lever 14 engages another tooth 13a of the toothed wheel 13, which is in the meantime rotated by the predetermined angle, thus reloading the advancement mechanism 12 for a next command or step of advancement of the toothed wheel 13 (and therefore of the cam 11).

An elastic return system 22 is operative between the actuator button 20 and the body of the valve 2 and between the actuator button 20 and the advancement mechanism 12, to return the actuator button 20 from the actuation (operating) position to the release (rest) position and to reposition the advancement mechanism 12 for the next step.

Figure 4:
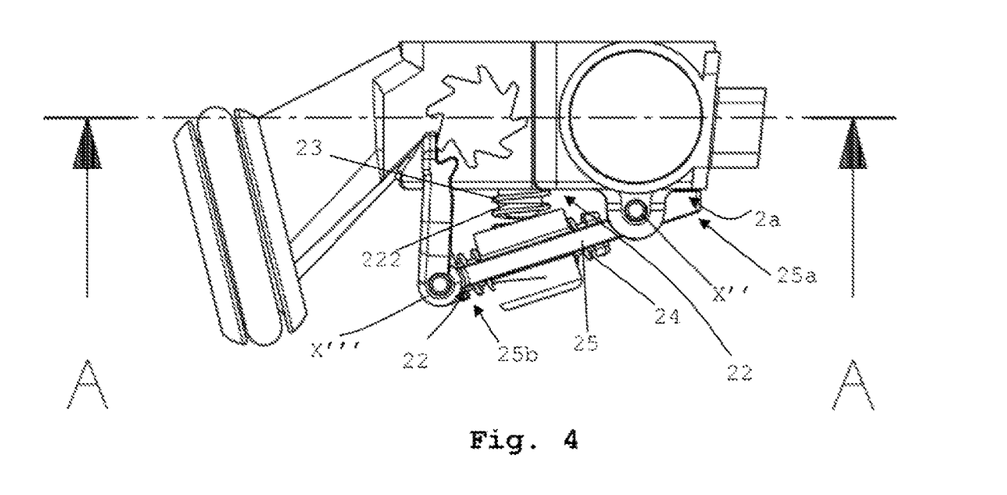
FIG. 4 is a side view of the valve of FIG. 1.
Figure 17:
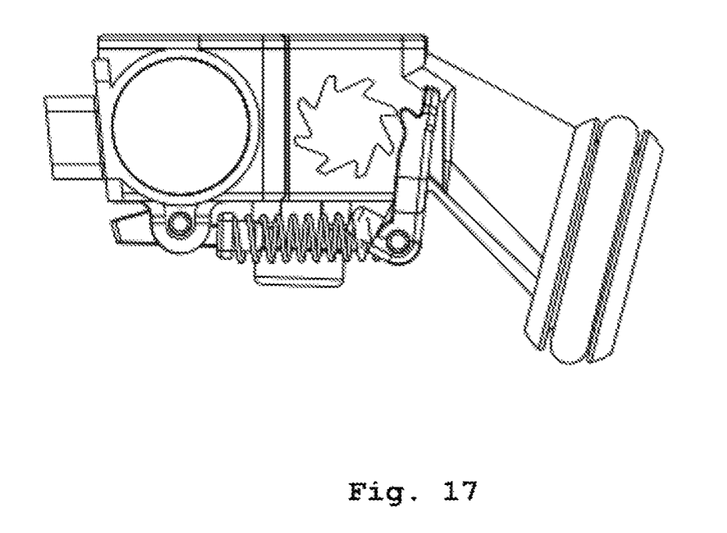
FIG. 17 is a side view of the valve of FIG. 1 in a phase of disengagement of a lever from a toothed wheel of an advancement mechanism.
Figure 18:
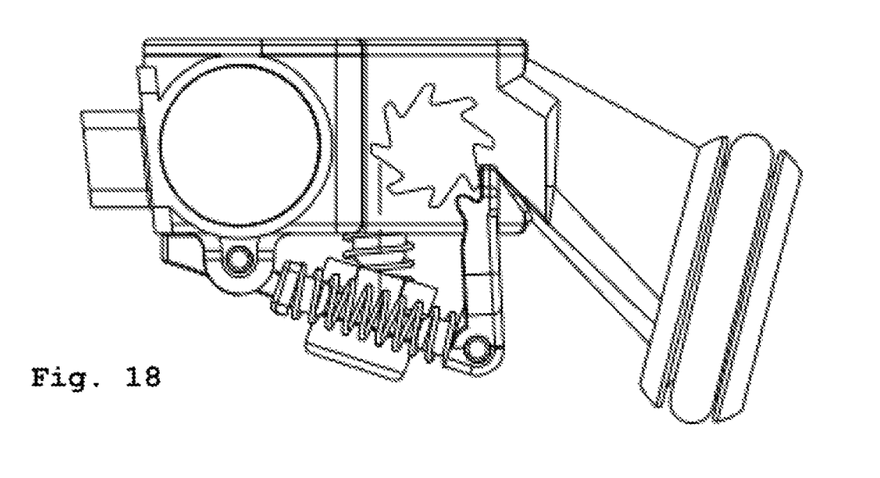
FIG. 18 is a side view of the valve of FIG. 17 in a phase of engagement of the lever from the toothed wheel.
Figure 19:
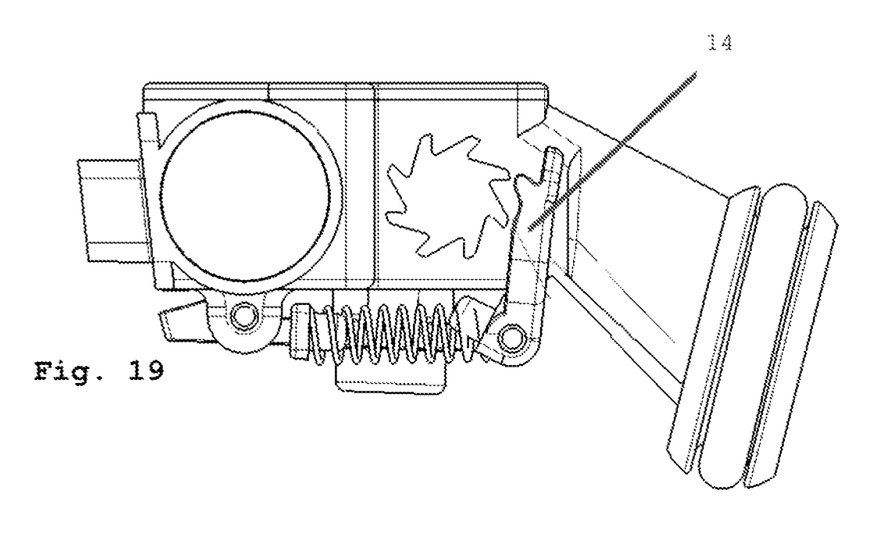
FIG. 19 is an enlarged view of FIG. 17.

The elastic return system 22 also generates the correct coupling between the toothed wheel 13 of the cam 11 and the lever 14 and allows to maintain constant contact between the two components, except for the position in which the actuation device 10 is triggered. With the actuator button 20 in the rest position (for example FIG. 4), the elastic return system 22 is configured to keep the profile 15 of the lever 14 in pushing contact with the tooth 13a of the toothed wheel 13 and to keep the actuator button 20 stably in position. With the actuator button 20 in the operating position (for example FIG. 17), where the button can be maintained by the user (that is, by exerting a pressure on the button 20), the lever 14 loses contact with the toothed wheel 13. The elastic return system 22 is configured to bring the profile 15 of the lever 14 back into a pushing contact with the next tooth of the toothed wheel and to bring the actuator button 20 back into the rest position, as soon as the user stops exerting pressure on the actuator button 20. The configuration of the elastic return system 22, according to an embodiment represented in the figure and based on a spring system, is described below.

The cam 11 preferably rotates on a second axis X' (FIG. 2) parallel to the first axis X of displacement of the closing body 4 and the toothed wheel 13 of the advancement mechanism 12 is mounted on the second axis X'. Such a spatial arrangement allows to approach the cam 11 and the closing body 4, compacting the valve 1, and also to compact the components of the actuation system 10 and of the actuator button 20. The rod 14 with the shaped profile 15, applied to the actuator button 20, and the elastic return system 22 configured to keep the shaped profile 15 in contact with the toothed wheel 13, and to interrupt the contact only in the actuation position of the actuator button 20, are located close to the valve body 2, outside it, constituting an encumbrance under the seat A and the seat B of the cam 11 and of the closing body 4.

As anticipated, the elastic return system 22 can include a first spring 23 (FIG. 4), between an outer surface 2a of the body of the valve 2 and the actuator button 20, and a second spring 24, between the rod 14 and the actuator button 20. The first spring 23 returns the actuator button 20 toward the rest position and the second spring 24 returns the lever 14 toward the toothed wheel 13, allowing the disengagement only in the operating position of the actuator button 20.

In particular, the actuator button 20 includes a plate 25, for example a plate with rectangular section, rotatably engaged, at a first side 25a, under the outer surface 2a of the body of the valve 2, and at a second other side 25b, with the rod 14. The first side 25a of the plate 25 is rotatable on a third axis X" (FIG. 1) parallel to the first axis of displacement X of the body of the valve 4.

Operatively, the plate 25 is parallel to the outer surface 2a of the body of the valve 2 in the actuation position of the actuator button 20 or is at a predetermined inclination with respect to the outer surface 2a of the body of the valve 2 in the release (rest) position of the actuator button 20. The third axis of displacement X" is parallel to the first axis of displacement (X) and remains fixed.

The axis X" passes, for example, through two holes f6 (FIG. 1) formed in respective plates p1 under the seat B, substantially adhering to the surface 2a, and passes through two holes f7 formed in the plate 25. Such a configuration allows bringing the plate 25 till the contact with the surface 2a.

The second side 25 of the plate 25 (FIG. 4) is rotatable on a fourth axis X''' (FIG. 1) parallel to the first axis of displacement X of the body of the valve 4. The fourth axis of displacement X''' is movable. In particular, the fourth axis X''' approaches the body of the valve 2 all the more so as the plate approaches the body of the valve. The lever 14, by rotating on the fourth axis X''' during the actuation of the actuator button 20, can remain in contact with the toothed wheel 13.

The plate 25 includes a coupling profile 28 of an end of the second spring 24, and the rod 14 includes a second coupling profile 18 of an opposite end of the second spring 24. The second spring 24, by acting on the second profile 18, between the plate 25 and the lever 14, returns the lever 14 in a direction of rotation on the axis X''' and brings the profile 15 into contact with the tooth 13a of the wheel 13. A rotation of the wheel 13 by effect of such contact with the lever 14 is prevented by a brake operating on the toothed wheel 11c of the cam, preventing rotation in one direction and allowing it only in the other direction. This brake operates in synergy with an inclined profile of the teeth 11b of the toothed wheel 11c, this inclination being favourable to the rotation precisely in a single direction of the wheel 13. Also the wheel 13 with inclined teeth, with the same inclination as the teeth of the wheel 11c. The rotation in one direction is also prevented by the shape coupling between the profile 15 of the lever 14 and the inclined teeth of the wheel 13, being instead allowed in the other direction.

The plate 25 also includes a coupling profile 29 of an end of the first spring 23 and the body of the valve 2 includes another coupling profile 222 (FIG. 4) of the opposite end of the first spring 23. The first and second spring extend in directions that are inclined the one with respect to the other.

The above-mentioned brake is preferably formed in the cover of the valve. In particular, the valve includes a closing cover 30 of the body of the valve 2 (FIG. 1). The inclined teeth 11b of the cam are arranged on the circumferential surface 11c of the cam 11, and the cover 30 includes an engagement profile (not visible in the figure) of the circumferential surface 11c between the teeth 11b, which prevents a rotation of the cam in a direction of rotation opposite to the direction of rotation imparted to the cam 11 by the advancement element 12, by contact with said inclined teeth. Consequently, an undesired rotation of the wheel 13 is prevented. Such a configuration increases the precision of the valve and prevents accidental actuation.

With reference to FIG. 5, further details of the valve according to the given embodiment are visible. In particular, the shaft 40 is visible, intended to be interposed between the cam 11 and the closing body 4 of the valve; the closing body 4 includes a cylinder 4a provided with at least one closing gasket 4b (on the annular sector 68) of the fluid path and a profile (annular sector 69) for coupling to the shaft 40 on the side of the closing gasket. The cylinder has an axis X corresponding to the first axis X of displacement.

The shaft 40 is structurally associated with a plate 41 sliding in a space delimited between a wall P of the body of the valve 2 which subdivides the housing seat A of the cam 11 from a housing seat B of the closing body 4. The housing seat B of the closing body 4 is spaced from the wall P substantially equal to the thickness of the plate 41. The wall P, more particularly, starts from the seat A, widening therefrom so as to delimit the seat B, with greater width than the seat A. The seat A and the seat B are in fluid communication, for the passage of water coming from the inlet 3 toward the outlets 38, 39.

The plate 41 has a height H equal to a height of the body of the valve 2 (measured inside the body) close to the wall P and has a height lower than a height of the body of the valve 2 between the housing seat A of the cam 11 and the housing seat B of the closing body 4, where there is passage of water.

FIG. 2 is a schematic view of the valve, in which the housing seat A of the cam 11 has a smaller width than the housing seat B of the closing body 4, and the housing seat B of the closing body 4 has a width substantially corresponding to the sum of the width of the housing seat A and of the thickness of the toothed wheel(s) 13, the at least one toothed wheel 13 being aligned at the housing seat B along a fifth axis X''' perpendicular to said second axis of displacement X'. Such a configuration and arrangement allow a further reduction in the size of the valve.

Some characteristics of the valve according to the present invention are summarized below.

The valve 1 has a valve body 2, a water inlet 3 which leads into the valve body 2 and two outlets 38, 39 which lead out of the valve body 2. The valve body 2 delimits a seat B of the closing body 4 of the valve. The closing body 4 can be used to open the outlets 38, 39 simultaneously or to close one of them selectively, in one embodiment of the valve, that is, the closing body does not close the outlets 38, 39 simultaneously in this embodiment.

The valve actuation button 20 includes a manual button controlled by the elastic return system 22 (or by an elastic thrust system, depending on the configuration), in particular springs 23, 24. The advancement mechanism 12 is formed by a lever 14 associated with the actuation button 20 and by a toothed wheel 13: at each actuation of the actuation button 20, the lever 13 engages a tooth of the wheel 13, making the wheel 13 advance by a predetermined angular step, for example by 45°.

The predetermined angular displacement is transmitted to the cam 11 inside the body of the valve 2, which is associated with the toothed wheel 13. The rotary motion of the cam 11 is transformed into the linear motion of the shaft 40 which engages, on one side, the cam 11 and, on the opposite side, the closing body 4 of the valve. The closing body 4 follows, for example, an alternating motion between two opposite end-of-stroke positions, which correspond to the closure of the fluid path through an outlet 38 or the opposite outlet 38. Between the two end-of-stroke positions, the closing body 4 can be brought to an intermediate position for opening both outlets 38, 39. Then, in the end-of-stroke positions, the closing body 4 closes the passage toward the outlets 38, 39 of the body of the valve. In an intermediate position, the closing body 4 of the valve releases both outlets 38, 39.

The closing body 4 of the valve is not spring-loaded toward the seat B of the valve. On the other hand, the shaft 40 and the associated plate 41 are those that keep the closing body 4 of the valve in one position, being it a closing position on one 38 or the other 39 outlets, or in the opening position of both outlets, due to an anti-slip system of the associated plate 41. As said, in fact, the plate 41 and the shaft 40 are associated with the cam 11 and the cam 11 is provided with a toothed wheel which prevents the wheel from shifting in the opposite direction with respect to that which can be imparted by the advancement mechanism 12. The spring 23, instead, acts between the actuator button 20 and the body of the valve 2, on the outer surface of the valve body 2 and not on the inner surface, where the closing body 4 is located.

The invention claimed is:

1. A valve for a bathroom or kitchen hand shower including
   a body of the valve;
   an inlet for water into the body of the valve;
   at least one outlet for the water out of the body of the valve,
   a closing body inside the body of the valve;
   an actuation device for shifting the closing body along a first axis between at least one closing position of a fluid path between the inlet and one of said at least one outlet and an opening position of the fluid path between the inlet and said at least one of said at least one outlet;
   an actuator button outside the body of the valve associated with the actuation device, wherein:
   the actuation device includes a cam located in the body of the valve and a stepwise advancement mechanism located outside the body of the valve and operatively associated with the cam; the cam being associated with the closing body of the valve and the advancement mechanism advancing by one step upon each next shift of the actuator button from a release position to an actuation position, making the closing body move between the closing and opening positions, an elastic return system is operative between the actuator button and the body of the valve and between the actuator button and the advancement mechanism, returning the actuator button from the actuation position to the release position and repositioning the advancement mechanism for a next step;

the advancement mechanism comprises at least one toothed wheel associated with the cam and rotatable around a second axis which is parallel to said first axis and at least one rod for a functional interconnection between the actuator button and the toothed wheel; and the actuator button comprises a plate rotatably engaged, at a first side, under an outer surface of the body of the valve, and rotatable about a third axis that is parallel to said first axis, said plate being rotatably engaged, at a second side, with the at least one rod, said at least one rod having a shaped profile for contacting said at least one toothed wheel and being rotatable around a fourth axis which is movable and parallel to said third axis.

2. Valve according to claim 1, wherein the cam rotates on said second and the at least one toothed wheel is mounted on the second axis, the elastic return system being configured to keep the shaped profile in contact with the toothed wheel, the contact being interrupted only in the actuation position of the actuator button.

3. Valve according to claim 2, wherein it includes a closing cover of the body of the valve and in that the cam includes a plurality of inclined teeth, arranged on a circumferential surface of the cam, and the cover includes a profile of engagement of the circumferential surface between the teeth, which prevents a rotation of the cam in a direction of rotation opposite to the direction of rotation imparted to the cam by the advancement mechanism, by contact with said inclined teeth.

4. Valve according to claim 3, wherein the toothed wheel includes a plurality of teeth that are inclined in a same direction of inclination as the teeth of the cam, said cam and said toothed wheel having the second axis in common.

5. Valve according to claim 1, wherein the elastic return system includes a first spring, between said outer surface of the body of the valve and the actuator button, and a second spring, between the at least one rod and the actuator button.

6. Valve according to claim 5, wherein said plate is parallel to the outer surface of the body of the valve in the actuation position of the actuator button or is at a predetermined inclination with respect to the outer surface of the body of the valve in the release position of the actuator button, said third axis parallel to the first axis remaining fixed.

7. Valve according to claim 6, wherein the second side of the plate is rotatable on said fourth axis.

8. Valve according to claim 5, wherein the plate includes a coupling profile of an end of the second spring, and the rod includes a second coupling profile of an opposite end of the second spring.

9. Valve according to claim 8, wherein the plate includes a coupling profile of an end of the first spring and the body of the valve includes another coupling profile of the opposite end of the first spring, said first and second spring extending along directions that are inclined the one with respect to the other.

10. Valve according to claim 1, wherein it includes a shaft between the cam and the closing body of the valve, said closing body including a cylinder provided with at least one closing gasket of the fluid path and a profile for coupling to the shaft at the side of said at least one closing gasket, the cylinder having an axis corresponding to the first axis.

11. Valve according to claim 10, wherein the shaft is structurally associated with a plate sliding in a space delimited between a wall of the body of the valve which subdivides a housing seat of the cam from a housing seat of the closing body, said housing seat of the closing body being spaced from the wall substantially in equal measure as a thickness of the plate.

12. Valve according to claim 11, wherein the plate has a height equal to a height of the body of the valve close to the wall and has a height lower than a height of the body of the valve between the housing seat of the cam and the housing seat of the closing body.

13. Valve according to claim 11, wherein the housing seat of the cam has a smaller width than the housing seat of the closing body and the housing seat of the closing body has a width substantially corresponding to a sum of the width of the housing seat and of the thickness of said at least one toothed wheel, said at least one toothed wheel being aligned at said housing seat along a fifth axis perpendicular to said second axis.

14. Valve according to claim 1, wherein the actuator button is hand-operated.

* * * * *